(No Model.) 3 Sheets—Sheet 1.
J. CLOUGH & R. ILLINGWORTH.
GEAR FOR BICYCLES.
No. 569,706. Patented Oct. 20, 1896.
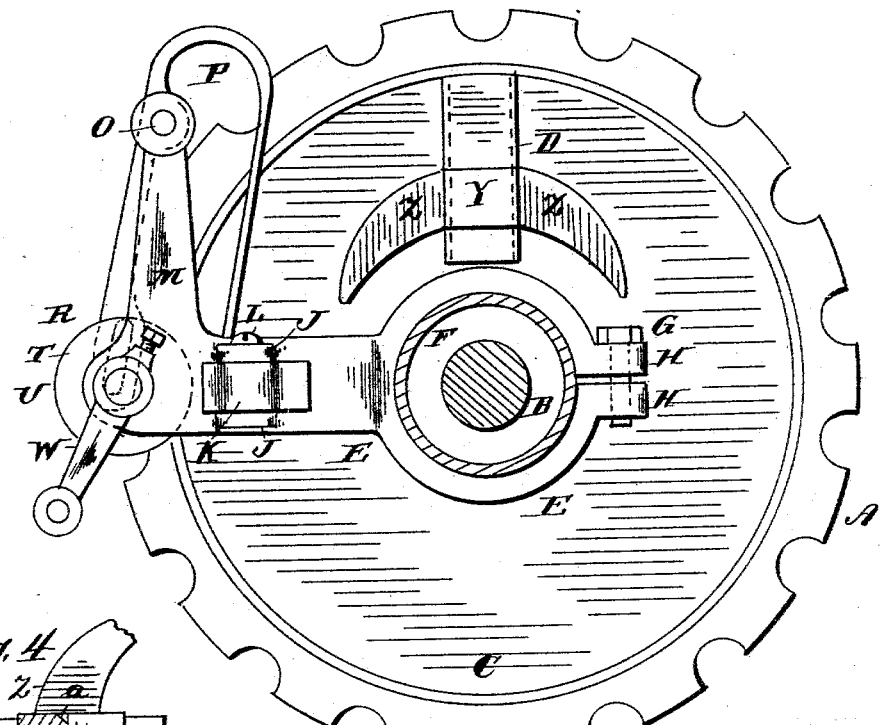
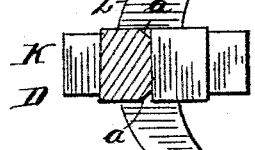
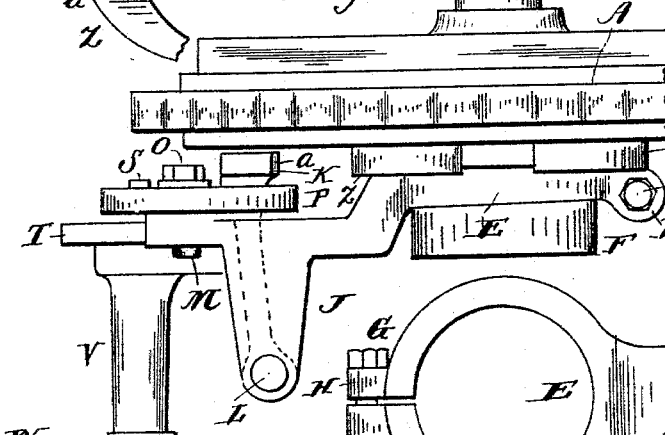
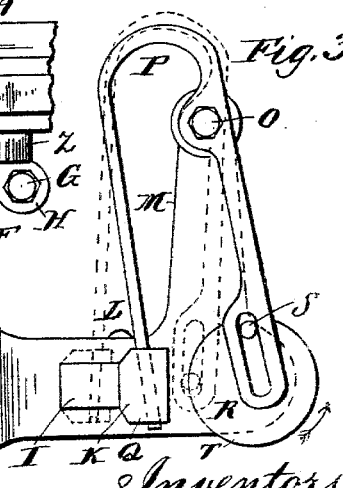
Witnesses:
L. C. Hills
J. D. Kingsbury
Inventors
John Clough
Rochester Illingworth
By Wm. C. Poulter, Attorney
THE NORRIS PETERS CO., PHOTO-LITHO., WASHINGTON, D. C.

(No Model.) 3 Sheets—Sheet 2.

J. CLOUGH & R. ILLINGWORTH.
GEAR FOR BICYCLES.

No. 569,706. Patented Oct. 20, 1896.

Witnesses:
L. C. Hills
J. V. Kingsbury

Inventors:
John Clough
Rochester Illingworth,
By Wm. E. Poulter
Attorney

THE NORRIS PETERS CO., PHOTO-LITHO., WASHINGTON, D. C.

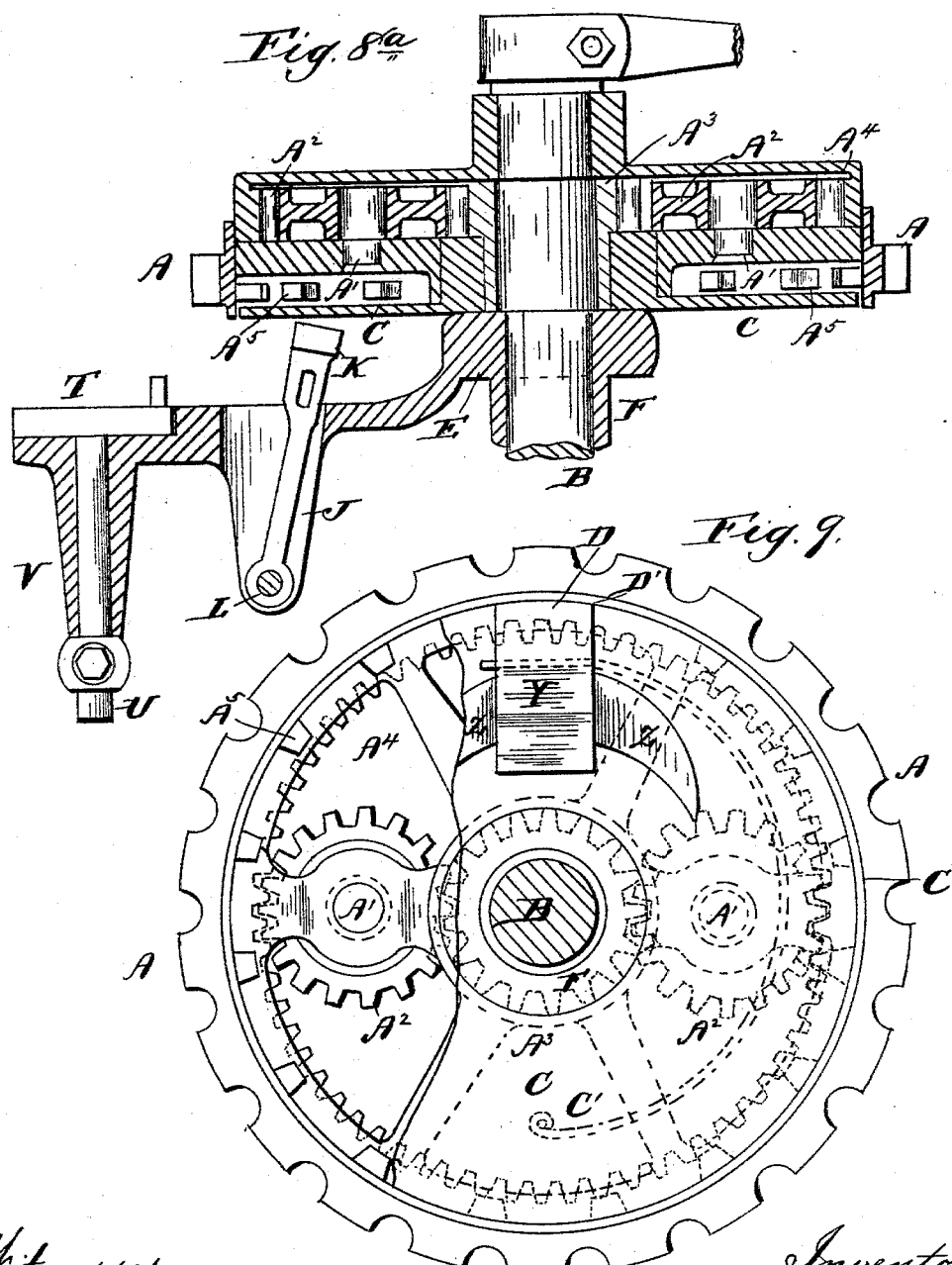

UNITED STATES PATENT OFFICE.

JOHN CLOUGH AND ROCHESTER ILLINGWORTH, OF BRADFORD, ENGLAND.

GEAR FOR BICYCLES.

SPECIFICATION forming part of Letters Patent No. 569,706, dated October 20, 1896.

Application filed December 27, 1895. Serial No. 573,528. (No model.) Patented in England March 4, 1892, No. 4,288; in France June 25, 1892, No. 222,587; in Belgium June 25, 1892, No. 100,282; in Switzerland June 25, 1892, No. 5,511; in Italy June 27, 1892, No. 39,173/172; in Germany July 3, 1892, No. 71,949, and in Austria-Hungary July 31, 1893, No. 8,984 and No. 32,024.

*To all whom it may concern:*

Be it known that we, JOHN CLOUGH and ROCHESTER ILLINGWORTH, subjects of the Queen of Great Britain, residing at Bradford, York county, England, have invented certain new and useful Improvements in Gears for Bicycles, (for which Letters Patent have been obtained in England, No. 4,288, dated March 4, 1892; in France, No. 222,587, dated June 25, 1892; in Belgium, No. 100,282, dated June 25, 1892; in Switzerland, No. 5,511, dated June 25, 1892: in Germany, No. 71,949, dated July 3, 1892; in Italy, No. 39,173/172, dated June 27, 1892, and in Austria-Hungary, No. 8,984 and No. 32,024, dated July 31, 1893,) of which the following is a full, clear, and exact description.

This invention relates to improvements in that type of change-gears or speed and power gears for velocipedes in which at one speed the whole of the mechanism is locked to and revolves with the chain or sprocket wheel or other part to which the gear is applied and at the other speed a portion of such mechanism is held stationary by being locked to a fixed part of the velocipede; and the object of this invention is to effect this unlocking and locking in a practically instantaneous manner, so as to prevent the gear being made inoperative by the said portion of mechanism remaining unlocked from both the chain-wheel and the velocipede for an appreciable time.

Figure 5:
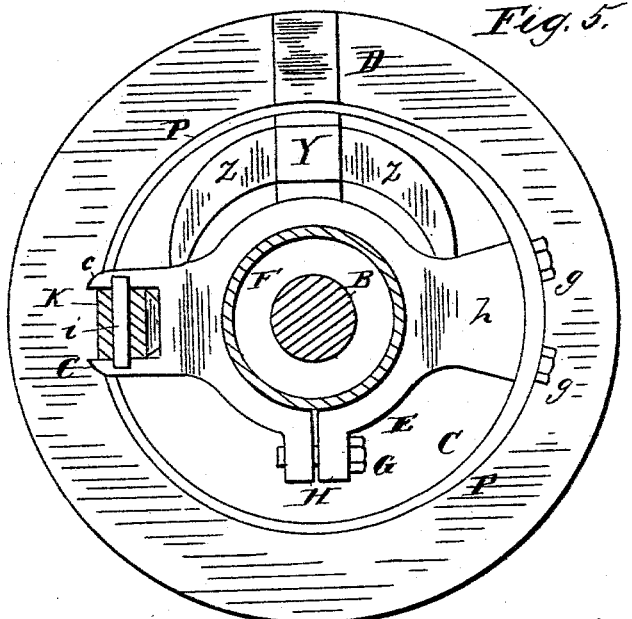
Figure 6:
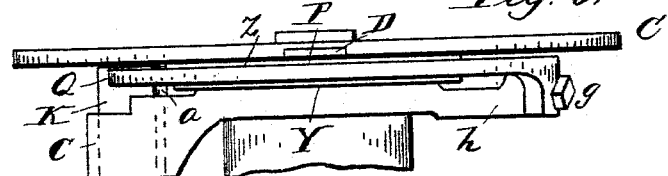
Figure 8:
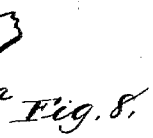
Figure 7:

In the accompanying drawings, illustrating our improvements, Figure 1 represents a cross-section through the bearing-case and a side view of a chain or sprocket wheel of a velocipede with our improvements applied thereto. Fig. 2 is a plan view of Fig. 1, partly broken away. Fig. 3 is a view of the reverse side of the bracket E and its attachments to that shown in Fig. 1. Fig. 4 is a view of a detail hereinafter referred to. Fig. 5 represents a similar view to Fig. 1 of the bearing-case and a side view of the side plate C, but illustrates a modified form of our improvements. Fig. 6 is a plan view of the same with our improved mechanism in the position required to engage and operate the locking-bolt during the next revolution of the chain-wheel, so as to hold the sun-wheel stationary. Fig. 7 is a similar view showing the mechanism drawn aside clear of the chain-wheel, leaving the locking-bolt free to pass to its outward limit. Fig. 8 is a view of a detail hereinafter referred to. Fig. 8$^a$ is a diametrical section of a change-gear sprocket-wheel of a cycle with the improvements seen in Figs. 1 to 4 applied. Fig. 9 is an elevation of the wheel alone with a portion of the plate C broken away to disclose the interior.

The chain-wheel contains an internal arrangement of any of the well-known types of epicyclic change-gears in which a sun-wheel or center-wheel is employed, and to reduce the speed of the chain-wheel A in relation to the crank-axle B such sun-wheel is held stationary by being locked to a fixed part of the velocipede, while at the other speed such sun-wheel is locked to and revolves with the chain-wheel. In the drawings this sun-wheel is rigidly secured to the side plate C, having a radial bolt D to lock it to the chain-wheel, which bolt is normally held at its outward limit by an internal spring. (Not shown.) This arrangement is not new and is merely mentioned to enable our improvements to be fully understood.

The bracket E is mounted on the bearing-case F and is shown clamped in position by the set-screw G, fitted in the lugs H, but it is obvious that such bracket may be brazed or secured to the case in any other convenient manner.

The bracket E is formed with a slot I and having lugs or spurs J J projecting from the sides and between these lugs, with its head projecting through the slot. The catch or detent K is pivotally mounted by means of the pin L. A strong curved spring P is pivoted by the screw O to the arm M, also projecting from the bracket E. One arm of this spring passes through a hole Q in the catch K, and a slot R, engaging the crank-pin S, is formed in the other arm of such spring. The pin S projects from the face of a disk T, fixed on the end of the short shaft U, mounted in the lateral projection V on the bracket E, and such shaft carries a lever W, by which it may be turned in the direction of the arrow, Fig. 3. This disk, shaft, and lever may be operated in any convenient manner, but preferably by means of a lever on the handle-bar, arranged and connected thereto in a similar manner to any of the ordinary types of brake-levers and their connections. By turning the disk T through approximately ninety degrees the spring P and the head of the catch K are moved nearer to the center of the chain-wheel into the position in which these parts are represented by the broken lines in Fig. 3.

The radial bolt D, mounted in the plate C, has a projection Y formed on it, which, when the plate is locked to the wheel A, has its outer face flush with the cams or eccentric projections Z Z, rigidly secured on either side of the plate C.

To disconnect the plate C from the wheel A and hold it stationary, the disk T is turned and the spring P and catch K are moved inward to the position represented by the broken lines in Fig. 3. Then as the plate C continues to revolve the cam Z meets the head of the catch K, and moving it on its pin L powerfully compresses the spring until the projection Y passes in front of the head of the catch, when such projection, being yielding, is instantaneously forced inward and the catch passes between the two cams, thus first releasing the bolt D and plate C from the wheel A and then holding such plate stationary.

Fig. 4 illustrates the manner in which the head of the catch interlocks with the two cams to hold the plate stationary.

In order to prevent the catch holding the plate before the bolt is disengaged from the wheel, the acting face of the head of the catch has the corners $a$ beveled off, so that the bolt is disengaged from A before the parallel part of the head passes in between the cams.

In the modification shown in Figs. 5, 6, 7, and 8 the catch or detent K' is intended to be drawn aside when the plate C is locked to A. In this case the catch shown in section in Fig. 5 is fitted between the parallel guides $c\,c$ of the bracket E', so that it is capable of both lateral and radial motion, and it is provided with a shank $d$, by which it is connected to the bell-crank lever $e$, pivoted to any convenient part of the framework, so as to draw the catch and move it to the position represented in Fig. 7, clear of the cams Z Z. A circular spring P' is employed, secured by the screws $g$ to the projection $h$ on the bracket E', and the ends of the spring each pass into the hole Q in the catch. The pin $i$, passed through the catch, abuts against the spurs $c\,c$ and prevents the catch passing too far between such spurs. The action is practically the same as the arrangement previously described, but it is moved laterally out of action instead of radially, the spring being drawn with it and springs the catch back into the position shown in Fig. 6, when the bell-crank lever $e$ is operated for that purpose.

Fig. 8 represents a section of the catch interlocking with the cams Z Z.

In Figs. $8^a$ and 9 we show the mechanism to be operated by the device set forth, the connection between such gear and the operating device, and the spring which holds the radial bolt normally in contact with the sprocket-wheel, and in these views we show the sprocket-wheel A as being provided with two studs A' A', on which the planet-wheels $A^2$ $A^2$ are mounted. These planet-wheels engage the sun-wheel $A^3$, rigidly secured to the plate C, and are driven by the internally-toothed wheel $A^4$, rigidly secured to the crank-shaft B. When the plate C is locked by the bolt D to the wheel A by means of the projection on the back of the bolt (represented by dotted lines D', Fig. 9) passing between two of the integral projections $A^5$ on wheel A, it will be evident that wheel $A^4$ will drive wheel A without independent motion of the internal gearing; but when the bolt D is unlocked from projections $A^5$ and held stationary by the catch K the sun-wheel also remains stationary, and therefore a reduced motion is imparted to wheel A from wheel $A^4$, for the wheels $A^3$ are at liberty to rotate to a certain extent as they revolve around the stationary sun-wheel. The curved spring C' (represented by dotted lines, Fig. 9) is secured to the inside of the plate C, and its free end bearing against the under or inner side of the projection at the back of the bolt D tends to press the latter to its outward limit to engage projections $A^5$ when released by catch K.

What we claim, and desire to secure by Letters Patent, is—

1. In a velocipede-gear of the character described, the combination with the crank-shaft and sprocket-wheel and the intermediate gearing, of internal projections on the sprocket-wheel, a revoluble plate, a bolt carried by the plate adapted to engage with said projections, and have a sliding movement, cam projections secured to the plate, and having a space between them adapted to receive the bolt and a spring-actuated catch or detent carried by the machine and adapted to enter the space between the cam projections and force the bolt out of engagement with the projections on the sprocket-wheel, as described.

2. In a velocipede-gear of the character described, the combination with the crank-shaft and sprocket-wheel, and the intermediate gearing, of a stationary bracket carried by the machine, a curved spring pivotally carried thereby, a revoluble disk having a crank-pin engaging one end of said spring and adapted to tilt or rock the latter, a catch or detent carried by the other end of the spring, internal projections carried by the sprocket-wheel, a revoluble plate, a bolt carried thereby and adapted to engage said projections and have a sliding movement, cam projections secured to the plate and having a space between them adapted to receive the bolt and a spring-actuated catch or detent carried by
5 the machine and adapted to enter within the space between the cam projections and force the bolt out of engagement with the projections on the sprocket-wheel, as described.

In testimony whereof we affix our signatures in presence of two witnesses.

JOHN CLOUGH.
ROCHESTER ILLINGWORTH.

Witnesses:
DAVID NOWELL,
SAMUEL A. DEACUP.